United States Patent
Van Rheeden

[11] Patent Number: 5,867,256
[45] Date of Patent: Feb. 2, 1999

[54] PASSIVE RANGE ESTIMATION USING IMAGE SIZE MEASUREMENTS

[75] Inventor: Donald R. Van Rheeden, The Colony, Tex.

[73] Assignee: Raytheon TI Systems, Inc., Lewisville, Tex.

[21] Appl. No.: 895,179

[22] Filed: Jul. 16, 1997

[51] Int. Cl.⁶ ................................................. G01C 03/08
[52] U.S. Cl. ................. 356/4.03; 382/106; 701/225
[58] Field of Search ..................... 356/4.03; 382/106; 701/225

[56] References Cited

U.S. PATENT DOCUMENTS

| | | | |
|---|---|---|---|
| 3,453,047 | 7/1969 | Olson et al. | 356/4.03 |
| 3,961,651 | 6/1976 | Gerharz | 356/1 |
| 4,341,447 | 7/1982 | Biber | 354/25 |
| 4,951,214 | 8/1990 | Hollister | 364/460 |
| 4,988,189 | 1/1991 | Kroupa et al. | 356/4.03 |
| 5,047,783 | 9/1991 | Hugenin | 342/179 |
| 5,148,209 | 9/1992 | Subbarao | 354/400 |
| 5,249,128 | 9/1993 | Markandey et al. | 364/426.04 |
| 5,479,360 | 12/1995 | Seif et al. | 364/516 |
| 5,483,241 | 1/1996 | Waineo et al. | 342/29 |

OTHER PUBLICATIONS

"An Angle–Only Tracking Filter in Modified Spherical Coordinates," by D. V. Stallard, Sc.D., Raytheon Company, Missile Systems Division, pp. 542–550, 1987.

"Biased Estimation Properties of the Pseudolinear Tracking Filter," by V.J. Aidala and S. C. Nardone, IEEE Transactions on Aerospace and Electronic Systems. vol. AES–18,No. 4, pp. 432–441, 1982.

"Observability Requirements for Three–Dimensional Tracking via Angle Measurements," by S.E. Hammel and V. J. Aidala, IEEE Transations on Aerospace and Electronic Systems, vol. AES–21, No. 1, pp. 200–207,1985.

Mood, Graybill & Boes, "Introduction to the Theory of Statistics," 3rd. Edition, McGraw–Hill, p. 181,1974.

*Primary Examiner*—Mark Hellner
*Attorney, Agent, or Firm*—Baker & Botts, L.L.P.

[57] ABSTRACT

A range estimation system and method which comprises a data base containing data for identification of certain targets and data for estimating the initial range to each of the targets as a function of the observed dimensions of the targets. A sensor (1) observes a scene containing a target a plurality of spaced apart times while the sensor is moving relative to the target to provide data from each observation of the scene relating to the dimensions of the target within the scene. The remaining range to the target is estimated from the observed dimensions of the target from the range traveled since a prior estimation of range and from a prior estimation of the remaining range to the target. The sensor (1) provides electrical signals representing the observed scene (3) and can be a visible light or infrared sensor. A computer (9) is used to identify the target from the data base, estimate the initial range to the target and estimate the remaining range from the range traveled between successive observations of the scene and the change of dimensions of the target in the observed scene.

13 Claims, 1 Drawing Sheet

PASSIVE RANGE ESTIMATION USING IMAGE SIZE MEASUREMENTS

BACKGROUND OF THE INVENTION

1. Field of the Invention

This invention relates to passive estimation of range from a sensor or seeker to an object and, more specifically, to a system and method for estimating such range based upon the change of size of the object with change of distance of the object of interest within a scene from the sensor.

2. Brief Description of the Prior Art

There are a number of situations wherein it is desirable to estimate the range to an object of interest or target. For example, if for some reason the ILS of an aircraft becomes disabled, it is highly advantageous to know the distance from the entrance to the runway to the aircraft to assist in landing. In the case of automotive travel, it would be highly desirable to always be aware of the distance between vehicles to avoid collisions. An air-to-air missile can use estimated range to the target to determine when to detonate its warhead. Anti-tank missiles which fly non-line-of-sight trajectories use range to determine target position on the battlefield.

Active techniques to measure range, such as radar, ladar and sonar, have been used extensively. The drawback of active ranging approaches, primarily in military applications, is that they can be easily detected by the target under attack. For example, if a submarine commander uses sonar to determine the position and velocity of an enemy ship, he runs a high risk of being detected. In such situations, it is advantageous to estimate range to the target passively.

The most common technique used to passively estimate range to a target employs a Kalman filter to estimate range from angle-only measurements. Initially, a rectangular Cartesian coordinate-based extended Kalman filter (EKF) is used to estimate target positions and velocities in Cartesian coordinates from angle measurements. Analytical and experimental work has shown that the Cartesian-based EKF suffers from instabilities and bias in the filter as discussed in "Fundamental Properties and Performance of Bearings-Only Target Motion Analysis", by S. C. Nardone et al., *IEEE Transactions on Auto. Control*, Vol. AC-29, No. 4, Sept. 1984, pp. 775–781. A paper entitled "An Angle-Only Tracking Filter in Modified Spherical Coordinates", by D. V. Stallard, *AIAA Guidance, Navigation, & Control Conference*, Vol. 1, Aug. 17–19, 1987, pp. 542–550 describes the use of modified spherical coordinates (MSC) which reduces problems with EKF observability, range bias and covariance ill-conditioning. In this paper, line-of-sight (LOS) angles of a missile are used as both filter measurements and states. This paper proposed the following six-state vector:

$$x = [\Theta \dot{\Theta} \Psi \omega 1/\dot{r}/r]^T$$

where $\Theta$ is the pitch LOS angle, $\dot{\Theta}=d\Theta/dt$, $\Psi$ T is the yaw LOS angle, $\omega=(d\Psi/dt)\cos\Theta$, $r$ is range to the target along the LOS and $\dot{r}$ is the range-rate to the target along the LOS. An important point that is noted is that the $1/r$ state can be determined only if the missile accelerates in a direction perpendicular to the LOS because, as can be demonstrated mathematically, when $1/r$ becomes observable, range can be passively estimated.

Considering a command to LOS flight from a gunner to a target, the missile flies as closely as possible to the LOS of the gunner. Missile accelerations perpendicular to the LOS due to climbing, diving or yaw maneuvers are undesirable since such maneuvers may cause the missile to hit the ground or miss the target completely. However, since the angle-only measurement EKF approaches require maneuvers away from the LOS, these techniques cannot be used for LOS-only engagements.

SUMMARY OF THE INVENTION

In accordance with the present invention, it has been determined that a sensor, such as a camera, IR detector, missile containing an imaging seeker or the like, using the size of the object or target and the size change of the object or target as seen within the sensed scene or picture over time as a guide as the distance between sensor and object changes, will provide an estimated range to the target. FIG. 1 shows the geometry to be used to derive a filter which will passively estimate range from target size and the change in target size with distance in the sensed scene to the target. If $x$ is a physical dimension of the target (e.g., width or height), $r$ is the range along the LOS from the sensor to the target and $\Psi$ is the angle subtended by $x$ in the sensor image, then $\tan\Psi = x/r$ and $d(\tan\Psi)/dt = (\dot{x}r - x\dot{r})/r^2 = \dot{x}/r - (\tan\Psi)(\dot{r}/r)$ and $d(1/r)/dt = -(1/r)^2\dot{r}$. If the target is not changing aspect with respect to the missile, then $\dot{x}=0$ and $d(\tan\Psi)/dt = -(\tan\Psi)\dot{r}(1/r)$.

Briefly, the above is accomplished by providing a data base containing data capable of determining the particular type of target of interest being sensed within the scene being observed by the sensor. This data base also is provided with data for each type of target therein relating to target dimensions as a function of distance from the target. While the range estimator travels in a direction relative to the target the sensor continually observes the target and the system calculates the dimensions of the target and provides a range estimate therefrom. It follows that the system is fully passive and provides an entirely different approach to range estimation as compared with the prior art.

DESCRIPTION OF THE PREFERRED EMBODIMENT

Figure 2:
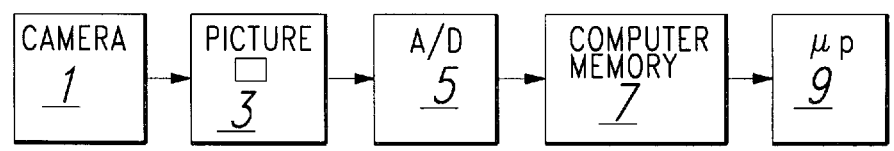
FIG. 2 is a block diagram of a passive range estimation system in accordance with the present invention.

Referring to FIG. 2, there is shown a seeker in the form of a sensor depicted as a TV camera 1 which is moved relative to a target, such as by being placed on a movable vehicle such as, for example, an automobile for use in a collision avoidance system. The sensor creates a picture 3 of a scene being observed. The picture is provided in digital form, either directly or by conversion from analog to digital form with a converter 5. This provides an array of numbers representing the observed intensity at each of the pixels of the picture observed. The intensity can be, for example, the amount of light received or the amount of heat sensed in the case of an IR detector. These numbers are stored in a memory 7. A microprocessor 9 then reads these numbers in memory 7 and attempts to determine the size of the target of interest within the observed picture therefrom, this being a standard technique as discussed in W. K. Pratt, *Digital Image Processing*, John Wiley & Sons, 1978, pp. 471–550.

This provides an instantaneous horizontal target dimension and an instantaneous vertical target dimension. This procedure and computation is continually repeated, such as, for example, thirty frames/second, while the distance between the target and the sensor simultaneously changes with the sensor generally traveling toward the target, though the invention herein merely requires known relative motion between target and sensor, preferably toward each other. With the sensor approaching the target, the target dimensions within the picture of the scene during each observation of the scene continue to increase with each successive observation. The initial range between the sensor and the target is computed from a data base containing data which recognizes the particular type of target (i.e., type of automobile, type of tank, etc.). Either the target type is known a priori, is recognized by a human operator, or is determined by an automatic target recognition (ATR) system such as described in "Automatic Target Recognition: State of the Art Survey", by B. Bhanu, *IEEE Transactions on Aerospace and Electronic Systems*, vol. AES-22, no. 4, July 1986, pp. 364–379. Once the target type is recognized, the average dimensions for the target type can be used to compute an initial range estimate.

Figure 1:
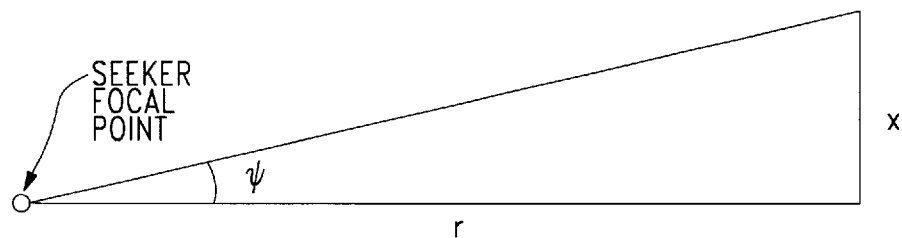
FIG. 1 shows the geometry to be used to derive a filter which will passively estimate range from target size and the change in target size it distance to the target.

Referring to FIG. 1, with x being the average physical height or width of the target type, and with $X_{init}$ being the initial target height or width, respectively, as measured by the microprocessor 9 of FIG. 2 within the first observed picture, if f is the seeker focal length, then the initial range estimate is computed as $r_{init} = f(X_{init})$.

The system contains a data base as a part of the microprocessor circuitry which includes data relating to the size and/or other features of each of the types of targets which are expected to be encountered. Such data is provided relating to these targets for various ranges from the target to the sensor as discussed above and a rough estimated initial range to the target is initially provided to the system, though the range estimate need not be very accurate and can be in error by a factor of up to about an order of magnitude.

With the estimated range to the target entered, the microprocessor 9 with data base as discussed above, in conjunction with an extended Kalman filter therein, predicts the range to the target from the prior range estimate and adds the range traveled toward the target by the sensor, the first predicted range calculation using the estimated distance to the target set into the system. The extended Kalman filter estimates the size of the target and, for mathematical reasons, estimates the inverse of the range. The steps involved in making the range and target size predictions are:

a. Estimating the range to the object (target) at sensor frame k−1 which is 1/inverse range estimate at frame k−1.

b. Determining the size of the object in physical dimensions (meters, feet, etc.) at frame k−1 from an estimate of tan Ψ at frame k−1 times the range estimate at frame k−1 in FIG. 1.

c. Estimating the range to the object at sensor frame k given frame k−1 which is the range estimate at frame k−1 plus the range traveled by the sensor between frames k−1 and k.

d. Estimating the inverse range for frame k, given frame k−1 which is one divided by the range estimate for frame k, knowing frame k−1.

e. Estimating the tan Ψ of the object at frame k, knowing the tan Ψ at frame k−1, this tan at frame k being the size of the object in physical dimensions at frame k−1 times the inverse range estimate for frame k, given frame k−1.

The remaining steps of the procedure involve standard extended Kalman filter equations as discussed in *Estimation Theory with Applications to Communications and Control*, by A. P. Sage and J. L. Melsa, McGraw-Hill, New York, 1971. These include a step of computing a residual and residual covariance wherein the size of the object in the picture is both predicted and measured with an error term being provided, along with the variance therebetween. The filter will then attempt to correct for the measured error by altering the estimate in a direction so as to correct the error. The intent is to drive the average error to zero to indicate that the system is predicting the size of the object correctly. When the size estimate is correct, this means that the range estimate is also correct at the same time. A step of adjusting the gain of the extended Kalman filter determines the weight to be given to the residual term to make the required corrections. This determines the speed at which the corrections are to be made, taking into account problems such as sensor noise. A step of state update and covariance takes the error term, multiplies it by some gains and adds the resulting corrections to the prior estimates of range and object size.

Assuming the extended Kalman filter state vector at sensor frame k−1, $x_{k-1}$, contains a first element $(\tan \Psi)_{k-1}$ and a second element $(1/r)_{k-1}$, the extended Kalman filter equations setting forth the above are as follows:

1. State predictions:

$$\hat{r}_{k-1} = 1 / \left( \frac{1}{r} \right)_{k-1}$$

$$\hat{x}_{k-1} = (\tan\psi)_{k-1} \hat{r}_{k-1}$$

$$\left( \frac{1}{r} \right)_{k|k-1} = \frac{1}{\hat{r}_{k-1} + \dot{r}_{k-1} \Delta T}$$

$$(\tan\psi)_{k|k-1} = \hat{x}_{k-1} \left( \frac{1}{r} \right)_{k|k-1}$$

$$\vec{x}_{k|k-1} = \left[ (\tan\psi)_{k|k-1} \quad \left( \frac{1}{r} \right)_{k|k-1} \right]^T$$

2. State covariance predictions:

$$\Phi_{k,k-1} = \begin{bmatrix} 1 - \dot{r}_{k-1} \left( \frac{1}{r} \right)_{k-1} \Delta T & -\dot{r}_{k-1} (\tan\psi)_{k-1} \Delta T \\ 0 & 1 - 2\dot{r}_{k-1} \left( \frac{1}{r} \right)_{k-1} \Delta T \end{bmatrix}$$

$$Q = \begin{bmatrix} q_{\tan\psi} & 0 \\ 0 & q_{1/r} \end{bmatrix}$$

$$P_{k|k-1} = \Phi_{k,k-1} P_{k-1} \Phi_{k,k-1}^T + Q$$

3. Residual and residual covariance:

$$v_k = (\tan \psi)_{k,measured} - (\tan \psi)_{k|k-1}$$
$$H = [1 \ 0]$$
$$S_k = H P_{k|k-1} H^T + \sigma_{\tan \psi}^2$$

4. Kalman gain:

$$K_k = P_{k|k-1} H^T S_k^{-1}$$

5. State update and covariance:

$$\vec{x}_k = \vec{x}_{k|k-1} + K_k v_k$$

$$P_k = P_{k|k-1} + KHP_{k|k-1}$$

The terms $q_{tan\ \psi}$ and $q_{1/r}$ are the plant noise variances for the tan $\psi$ and $\frac{1}{r}$ states, respectively. The variance $\sigma_{tan\ \psi}^2$ is the measurement uncertainty of tan $\psi$. The term $\dot{r}_{k-1}$ is the known relative closure rate between the sensor and the target at sensor frame k−1. The term $\Delta T$ represents the time elapsed between sensor frames k−1 and k.

The initial state vector can be computed as $x_0 = [\tan(\Psi_0) (1/r_{init})]^T$ where $\Psi_0$ is the initial target size measurement and $r_{init}$ is the initial range estimate. The initial range estimate is computed from expected target dimensions and the initial target size as measured in the image. The initial state covariance matrix, $P_0$, is specified as:

$$P_0 = \begin{bmatrix} \sigma_{tan\psi}^2 & 0 \\ 0 & \sigma_{r\_init}^2 \left(\frac{1}{\hat{r}_{init}}\right)^4 \end{bmatrix}$$

The (2,2) element of the matrix $P_0$ is computed using $$Var\left[\frac{1}{r}\right] \approx \frac{Var[r]}{\mu_r^4}$$

(see *Introduction to the Theory of Statistics*, by A. M. Mood, F. A. Graybill, and D. C. Boes, 3rd Ed., 1974, p. 181, equation 15).

The extended Kalman filter defined herein is similar to the modified polar coordinate (MPC) filter described by Stallard in a previously cited reference. However, instead of relying upon LOS angles and LOS angle rates, this new filter uses target size.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A range estimation method which comprises the steps of:
   (a) providing a data base containing data for identification of certain targets and data for estimating an initial range to each of said certain targets as a function of observed dimensions of said targets;
   (b) observing a scene containing a target a plurality of spaced apart times while moving relative to said target;
   (c) obtaining data from each observation of said scene relating to a dimension of said target;
   (d) identifying said target from said data base, and using the corresponding initial range from said data base to initially estimate a remaining range to said target; and
   (e) thereafter repeatedly estimating the remaining range to said target from said data obtained by a respective said observation and from a prior estimation of the remaining range to said target.

2. A range estimation method, comprising the steps of:
   observing a scene containing an object at a plurality of successive points in time while moving relative to the scene;
   determining size information regarding the object from each observation of the scene; and
   estimating, in response to each observation of the scene, a range to the object as a function of the prior estimate of the range and as a function of the size information from the most recent observation of the scene.

3. A method according to claim 2, wherein said estimating step includes the steps of:
   generating a predicted range by adjusting the prior estimate of the range as a function of the velocity of movement relative to the scene and the elapsed time between the most recent observation and the immediately preceding observation;
   estimating a size of the object as a function of the predicted range;
   comparing the estimated size to the size information from the most recent observation of the scene in order to determine a size error;
   effecting an adjustment to the estimated size which reduces the size error, while effecting a proportional adjustment to an inverse of the predicted range; and
   generating the estimate of the range by inverting the adjusted inverse of the predicted range.

4. A method according to claim 1, wherein said estimating step includes the step of filtering the size information obtained during successive observations of the scene.

5. A method according to claim 4, wherein said filtering step is carried out using extended Kalman-type filtering techniques.

6. A method according to claim 2, including the steps of:
   providing a database containing data for identifying predetermined objects, and containing data for estimating an initial range to each predetermined object as a function of an observed dimension therefor;
   identifying the object in the scene by comparatively evaluating data from a first of the observations of the scene with data from the database; and
   using the initial range information in the database to generate an initial estimate of the range to the object in the scene.

7. A method according to claim 2, wherein said observing step is carried out at least three times at respective different points in time.

8. A range estimation system, comprising:
   means for observing a scene containing an object at a plurality of successive points in time while said means for observing is moving relative to the scene;
   means for determining size information regarding the object from each observation of the scene by said means for observing; and
   means for estimating, in response to each observation of the scene, a range to the object as a function of a prior estimate of the range and as a function of the size information from the most recent observation of the scene.

9. A system according to claim 8, wherein said means for estimating includes:
   means for generating a predicted range by adjusting the prior estimate of the range as a function of the velocity of movement relative to the scene and the elapsed time between the most recent observation and the immediately preceding observation;
   means for estimating a size of the object as a function of the predicted range;

means for comparing the estimated size to the size information from the most recent observation of the scene in order to determine a size error;

means for effecting an adjustment to the estimated size which reduces the size error, while effecting a proportional adjustment to an inverse of the predicted range; and means for generating the estimate of the range by inverting the adjusted inverse of the predicted range.

10. A system according to claim 8, wherein said means for estimating includes filtering means for filtering the size information obtained during successive observations of the scene.

11. A system according to claim 10, wherein said filtering means uses an extended Kalman-type filter.

12. A system according to claim 8, including:

a database containing data for identifying predetermined objects, and containing data for estimating an initial range to each predetermined object as a function of an observed dimension therefore:

means for identifying the object in the scene by comparatively evaluating data from a first of the observations of the scene with data from the database; and means for using the initial range information in the database to generate an initial estimate of the range to the object in the scene.

13. A system according to claim 8, wherein said means for observing is operative to observe the scene at least three times at respective different points in time.

* * * * *

UNITED STATES PATENT AND TRADEMARK OFFICE
CERTIFICATE OF CORRECTION

PATENT NO. : 5,867,256
DATED : February 2, 1999
INVENTOR(S) : Van Rheeden

It is certified that error appears in the above-identified patent and that said Letters Patent is hereby corrected as shown below:

Column 1, line 56, delete "$x=[\Theta\Theta\Psi\omega 1/rr/r]^T$" and insert --$\underline{x}=[\Theta\Theta\Psi\omega 1/rr/r]^T$--.

Column 3, line 29, delete "$r_{init}=f(X_{init})$" and insert --$r_{init}=f(x/X_{init})$--.

Column 4, lines 43-49, delete"
$$\Phi_{kk-1} \begin{bmatrix} 1-r_{k-1}\left(\frac{1}{r}\right)_{k-1}\Delta T & -r_{k-1}(\tan\Psi)_{k-1}\Delta T \\ 0 & 1-2r_{k-1}\left(\frac{1}{r}\right)_{k-1}\Delta T \end{bmatrix}"$$

and insert --
$$\Phi_{kk-1} \begin{bmatrix} 1-r_{k-1}\left(\frac{1}{r}\right)_{k-1}\Delta T & -r_{k-1}(\tan\Psi)_{k-1}\Delta T \\ 0 & 1-2r_{k-1}\left(\frac{1}{r}\right)_{k-1}\Delta T \end{bmatrix}--$$

Column 4, line 59, delete "$S_k=HP_{kk-1}H^T+O_{\tan\Psi}{}^2$" and insert --$S_k=HP_{k/k-1}H^T+O^2_{\tan\Psi}$--.

UNITED STATES PATENT AND TRADEMARK OFFICE
CERTIFICATE OF CORRECTION

PATENT NO. : 5,867,256
DATED : February 2, 1999
INVENTOR(S) : Van Rheeden

It is certified that error appears in the above-identified patent and that said Letters Patent is hereby corrected as shown below:

Column 5, line 8, delete "$x_0=[\tan(\Psi_0)$" and insert --$x_0=[\tan(\Psi_0)$--.

Signed and Sealed this

Twenty-eighth Day of December, 1999

Attest:

Q. TODD DICKINSON

*Attesting Officer*     *Acting Commissioner of Patents and Trademarks*